United States Patent [19]

Maxey

[11] 3,856,761

[45] Dec. 24, 1974

[54] SULFUR VULCANIZATION SYSTEM CONTAINING A TWO-COMPONENT ACCELERATOR SYSTEM

[75] Inventor: Frank S. Maxey, Akron, Ohio

[73] Assignee: The Goodyear Tire & Rubber Company, Akron, Ohio

[22] Filed: Apr. 18, 1972

[21] Appl. No.: 245,262

Related U.S. Application Data

[63] Continuation-in-part of Ser. No. 215,411, Jan. 4, 1972, abandoned.

[52] U.S. Cl............. 260/79.5 B, 252/182, 260/786
[51] Int. Cl..... C08c 11/62, C08d 9/00, C08f 27/06
[58] Field of Search.......... 260/79.5 R, 79.5 B, 785, 260/786; 252/182

[56] References Cited
UNITED STATES PATENTS

| 3,118,863 | 1/1964 | Knill | 260/79.5 |
|---|---|---|---|
| 3,557,028 | 1/1971 | Turk | 260/5 |

*Primary Examiner*—Christopher A. Henderson
*Attorney, Agent, or Firm*—F. W. Brunner; J. A. Rozmajzl

[57] ABSTRACT

Two-component accelerator system for the sulfur vulcanization of rubber, one accelerator being 2-(morpholinodithio)-benzothiazole and the other accelerator being an amino thiazole monosulfide such as 2-(morpholinothio)-benzothiazole.

3 Claims, No Drawings

SULFUR VULCANIZATION SYSTEM CONTAINING A TWO-COMPONENT ACCELERATOR SYSTEM

This is a continuation-in-part application of application Ser. No. 215,411 filed Jan. 4, 1972, and now abandoned.

This invention relates to an improved accelerator system for the vulcanization of rubber. More particularly it relates to a two-component accelerator system which provides a vulcanized rubber possessing improved physical properties both before and after heat aging.

Rubber compounders are constantly searching for improved accelerator systems for the sulfur vulcanization of rubber. Such accelerator systems should preferably provide good scorch resistance, reasonable vulcanization rates and adequate physical properties, both aged and unaged.

It is an object of this invention to provide an accelerator system to be used in the sulfur vulcanization of rubber. It is a further object of this invention to provide an accelerator system which provides, on vulcanization, a vulcanizate having improved physical properties, both aged and unaged. It is another object of this invention to provide vulcanizable rubber polymers which are capable of being vulcanized to provide improved vulcanizates. Other objects will become apparent subsequently herein.

The objects of the present invention are accomplished by vulcanizing a rubbery composition containing free sulfur and an accelerator system comprising (A) 2-(morpholinodithio)-benzothiazole and (B) at least one amino thiazole monosulfide compound having the following structural formula:

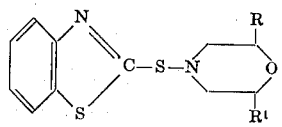

wherein R and R$^1$ are the same and are selected from the group consisting of hydrogen and alkyl radicals having one to four carbon atoms, e.g., methyl.

The amino thiazole monosulfide compound is represented by, but not limited to 2-(morpholinothio)-benzothiazole, 2-(2,6-dimethyl-4-morpholinothio)-benzothiazole and 2-(2,6-di-tert.butyl-4-morpholinothio)-benzothiazole.

The 2-(morpholinodithio)-benzothiazole (MDB) is well known in the art and can be prepared by well known processes such as that described in U.S. Pat. No. 2,837,519.

The amino thiazole monosulfide (ATM) compounds are well known in the art and can be prepared by well known processes such as that described in U.S. Pat. Nos. 1,943,790 and 2,024,575.

The accelerator system of the present invention is used in vulcanizable rubbery compositions, compounded or uncompounded, along with 0.10 to 3.25 parts by weight of free sulfur based on 100 parts by weight of uncompounded rubber. The MDB must be 40 percent to 80 percent (preferably 50 to 70 percent) by weight of the total MDB/ATM combination. That is, the weight ratio of the MDB to the ATM compound is from 2/3 to 4/1 (preferably 1/1 to 7/3).

The accelerator level varies from 0.50 to 3.25 parts by weight per 100 parts by weight of uncompounded rubber. Improvements in physical properties are obtained at low sulphur levels, i.e., from 0.10 to and including 1.25 parts of free sulfur and high sulfur levels (above 1.25 parts and up to 3.25 parts of free sulfur). The sum of the two-component accelerator system and the sulfur ranges from 2.25 to 5.50 parts by weight per 100 parts by weight of rubber.

The accelerator can be compounded into the rubber by any conventional method, such as by addition to the rubber on a mill or a Banbury when the rubber is a solid. The rubbers can contain any conventional compounding ingredients such as carbon black, zinc oxide and even other accelerators to the extent that the accelerators do not interfere substantially with the improvement offered by the accelerator system of the present invention.

The rubber vulcanizates prepared using this accelerator system can be used in any of their normal applications, such as in pneumatic vehicle tires and industrial products.

The following examples are intended to illustrate but not to limit the practice of the present invention. Unless indicated otherwise, all parts are parts by weight.

Natural rubber, SBR (rubbery butadiene-1,3/styrene copolymers) and NBR (rubbery butadiene-1,3/acrylonitrile copolymers) were compounded with the accelerator system of the present invention using conventional Banburying and milling procedures.

The non-productive formulations for the compounded rubbers were as follows in parts by weight.

| Ingredients | 1-6 | 7-9 | Examples 10-12 | 13-15 | 16-18 |
|---|---|---|---|---|---|
| Natural | 100.0 | | | | |
| SBR 1500 | | 100.0 | | 100.0 | |
| 67/33 butadiene-1,3/ acrylonitrile | | | 100.0 | | 100.0 |
| Zinc oxide | 5.0 | 3.0 | 5.0 | 3.0 | 5.0 |
| Stearic acid | 1.0 | 2.0 | 1.0 | 2.0 | 1.0 |
| Amine antioxidant | 1.0 | 1.0 | 1.0 | 1.0 | 1.0 |
| HAF black | 40.0 | 40.0 | 40.0 | 40.0 | 40.0 |
| Petroleum softener | 3.0 | | | | |
| Aromatic oil | | 5.0 | | | |
| Dibutyl phthalate | | | 5.0 | | 5.0 |
| Processing oil | | | | 5.0 | |

In each of the following sets of examples, rubbers were tested using 2-(morpholinodithio)-benzothiazole, (MDB), and 2-(morpholinothio)-benzothiazole, (MOR), alone and in combination. Examples 3, 6, 9, 12, 15 and 18 illustrate the practice of the present invention. It is understood in each of the following examples that in addition to the sulfur and accelerator amounts indicated, the rubbers also contained the ingredients indicated in the non-productive formulations recited earlier herein.

|  | Examples 1 to 6 | | | | | |
| --- | --- | --- | --- | --- | --- | --- |
|  | 1 | 2 | 3 | 4 | 5 | 6 |
| Sulfur | 2.75 | 2.75 | 2.75 | 0.3 | 0.3 | 0.3 |
| MDB | 0.60 |  | .30 | 3.0 |  |  |
| MOR |  | 0.60 | .30 |  | 3.0 | 1.5 |
|  |  |  |  |  |  | 1.5 |
| OCT at 143°C. (1) | 20 | 20 | 20 | 28 | 38 | 27 |
| Mooney Scorch at 120°C. |  |  |  |  |  |  |
| Δ5 (2) | 30 | 30 | 30+ | 30+ | 30+ | 30+ |
| T/E (Kg/cm²) (3) | 290/ | 275/ | 298/ | 275/ | 273/ | 295/ |
|  | 600 | 600 | 620 | 550 | 600 | 580 |
| 300M/Shore A (4) | 99/ | 103/ | 105/ | 116/ | 85/ | 104/ |
|  | 60 | 61 | 61 | 62 | 56 | 61 |
| Tear (Kg/cm) | 106 | 99 | 117 | 92 | 93 | 86 |
| Goodrich Flexometer Δ T°C. |  |  |  |  |  |  |
| Original | 17.0 | 16.8 | 15.3 | 20.1 | 22.1 | 19.3 |
| Aged (5) | 21.8 | 21.9 | 20.0 | 18.8 | 23.1 | 20.6 |
| Flex (6) — Original | 183 | 148 | 204 | 100 | 80 | 102 |
| Aged | 133 | 123 | 170 | 83 | 79 | 93 |
| Aged T/E (7) | 102/ | 91/ | 134/ | 243/ | 214/ | 252/ |
|  | 250 | 260 | 300 | 430 | 560 | 450 |
| Aged 300/Shore A | —/60 | —/58 | 134/ | 133/ | 119/ | 123/ |
|  |  |  | 63 | 65 | 58 | 63 |

Footnotes
(1) Optimum cure time (OCT) was determined using the Monsanto Rheometer. 100 CPM 3° arc.
(2) Δ5 figure indicates the number of minutes before the torque of a Mooney viscometer increases 5 points above the minimum value. It represents the degree of processing safety of rubber compounds.
(3) T/E is a measure of the tensile strength and elongation.
(4) 300M/Shore A measures the stress at 300% elongation and Shore A is a measure of the hardness as measured by the Shore A durometer.
(5) Aged refers to the result after aging 22 hours at 100°C. (212°F.).
(6) Flex test is the Goodyear 66% Flex test. Original tests were run at 25°C. while aged refers to the flex test results run after the samples had been aged in a hot air oven for 22 hours at 100°C.
(7) Aged T/E is tensile and elongation properties measured after the samples had been aged in a hot air oven for 70 hours at 100° C.

These data indicate that the properties of the compounds containing a combination of MDB and MOR (Examples 3 and 6) were superior both initially and after aging than compounds containing either accelerator alone.

|  | Examples 7 to 9 | | |
| --- | --- | --- | --- |
|  | 7 | 8 | 9 |
| Sulfur | 1.75 | 1.75 | 1.75 |
| MDB | 1.0 |  | .50 |
| MOR |  | 1.0 | .50 |
| OCT at 143°C. | 40 | 45 | 41 |
| Mooney Scorch at 120°C. |  |  |  |
| Δ5 | 30+ | 30+ | 30+ |
| T/E (Kg/cm²) | 232/ | 227/ | 248/ |
|  | 510 | 630 | 560 |
| 300M/Shore A | 99/ | 77/ | 98/ |
|  | 62 | 63 | 63 |
| Tear (Kg/cm) | 44 | 40 | 39.2 |
| Aged T/E | 189/ | 186/ | 200/ |
|  | 320 | 320 | 370 |
| Aged 300M/Shore A | 183/ | 180/ | 147/ |
|  | 72 | 73 | 70 |
| Flex — Original | 175 | 141 | 182 |
| Aged | 106 | 60 | 128 |
| Goodrich Flexometer ΔT°C. |  |  |  |
| Original | 29.6 | 36.6 | 29.6 |
| Aged | 26.2 | 26.2 | 27.0 |

These results indicate that the compound containing both MDB and MOR (Example 9) had superior physical properties both before and after aging. The lower modulus value of the compound containing the MDB/MOR combination does not indicate that it is inferior. It is lower because it has higher elongation and hardened less on aging.

|  | Examples 10 to 12 | | |
| --- | --- | --- | --- |
|  | 10 | 11 | 12 |
| Sulfur | 1.75 | 1.75 | 1.75 |
| MDB | .80 |  | .40 |
| MOR |  | .80 | .40 |
| OCT at 143°C. | 32 | 30 | 28 |
| Mooney Scorch at 120°C. |  |  |  |
| Δ5 | 30+ | 30+ | 30+ |
| T/E (Kg/cm²) | 252/ | 245 | 260/ |
|  | 520 | 500 | 550 |
| 300M/Shore A | 119/ | 119/ | 105/ |
|  | 66 | 66 | 66 |
| Air Aged T/E | 119/ | 88/ | 138/ |
|  | 60 | 80 | 210 |
| Air Aged 300M/ Shore A | —/78 | —/78 | —/75 |
| Oil Aged T/E | 185/ | 158/ | 200/ |
|  | 350 | 280 | 380 |
| Oil Aged 300M/ Shore A | 154/ 60 | —/60 | 134/ 54 |

The lower modulus of the vulcanizate of Example 12 is not an inferior value. It is slightly lower because this compound has higher tensile and elongation than the other two compounds. The compound containing the MDB/MOR combination (Example 12) has superior physical properties both originally and after aging as was the case in the other examples.

|  | Examples 13 to 15 | | |
| --- | --- | --- | --- |
|  | 13 | 14 | 15 |
| Sulfur | 0.3 | 0.3 | 0.3 |
| MDB | 3.0 |  | 1.5 |
| MOR |  | 3.0 | 1.5 |
| OCT at 143° C. | 33 | 43 | 33 |
| Mooney Scorch at 120°C. |  |  |  |
| Δ5 | 30+ | 30+ | 30+ |

-Continued

| | Examples 13 to 15 | | |
|---|---|---|---|
| | 13 | 14 | 15 |
| T/E (Kg/cm²) | 238/ 530 | 189/ 700 | 248/ 560 |
| 300M/Shore A | 98/ 62 | 49/ 60 | 105/ 61 |
| Tear | 39 | 44 | 42 |
| Aged T/E | 188/ 420 | 193/ 620 | 219/ 490 |
| Aged 300M/Shore A | 112/ 66 | 63/ 63 | 119/ 66 |
| Flex — Original | 240 | 240+ | 240+ |
| Flex — Aged | 34 | 218 | 218 |
| Goodrich Flexometer Δ T°C. | | | |
| Original | 34.2 | 77 | 34.2 |
| Aged | 32.4 | 67 | 31.6 |

These examples show that the compound containing the MDB/MOR combination has better aging characteristics than the other two. It is also evident that the compound containing MOR alone is badly undervulcanized but that the compound containing the MDB/MOR combination (Example 15) has attained a better state of vulcanization than either accelerator alone.

| | Examples 16 to 18 | | |
|---|---|---|---|
| | 16 | 17 | 18 |
| Sulfur | 0.3 | 0.3 | 0.3 |
| MDB | 3.0 | | 1.5 |
| MOR | | 3.0 | 1.5 |
| OCT at 143°C. | 30 | 35 | 27 |
| Mooney Scorch at 120°C. | | | |
| Δ5 | 30+ | 30+ | 30+ |
| T/E (Kg/cm²) | 234/ 610 | 153/ 660 | 218/ 520 |
| 300M/Shore A | 68/ 66 | 35/ 64 | 115/ 66 |
| Aged T/E | 204/ 390 | 182/ 450 | 204/ 410 |
| Aged 300M/Shore | 155/ 75 | 57/ 76 | 154/ 75 |
| Oil Aged T/E | 190/ 380 | 140/ 290 | 195/ 380 |
| Oil Aged 300M/ Shore A | 160/ 50 | —/44 | 175/ 50 |
| Tear (Kg/cm) | 50 | 48 | 51 |

The compound containing the MDB/MOR combination (Example 18) possessed superior physical properties after aging than the ones containing a single accelerator. The original tensile of Example 18 is not as high as the one with MDB alone, but is far superior to that of the compound with MOR alone, and much higher than a numerical average of the two.

The other amino thiazole monosulfide compounds described earlier herein could have been substituted for their counterparts MOR and MDB in the preceding working examples to produce vulcanizates with a superior combination of physical properties.

Likewise, various other polymers could have been substituted for those used in the preceding working examples, such as cis-1,4 polyisoprene, cis-1,4 polybutadiene or ethylene/propylene/1,4-hexadiene polymers. Naturally, as the rubber is changed or a different loading is used, standard changes in the compounding recipe would be made to obtain optimum results.

The sulfur vulcanizable rubbers that will benefit from this invention include natural rubber and synthetic rubbers and mixtures thereof. Synthetic rubbers that can be improved by the practice of the present invention include the following elastomers, either alone or in blends, cis-1,4 polyisoprene, polybutadiene, including cis-1,4 polybutadiene, rubbery copolymers of 1,3-dienes such as 1,3-butadiene, isoprene or 2,3-dimethyl-1,3-butadiene with other monomers, for example styrene, acrylonitrile and methyl methacrylate. Ethylene propylene terpolymers (EPDM), i.e., with a non-conjugated diene, for example, terpolymers of ethylene propylene and dicyclopentadiene or 1,4-hexadiene or ethylidiene norbornene can also benefit from the present invention. For maximum benefit, the EPDM polymer should be classified as "fast curing" or "ultra fast curing." In fact, for best results any polymer used should vulcanize readily. Chlorinated polymers which possess unsaturation such as polychloroprene will show improved vulcanizate properties when used in the practice of the present invention as will polyalkenamers such as polyoctenamer prepared by a ring opening process involving cyclooctene. Although it is generally preferred that the mole percent unsaturation of the polymer be at least 1.0 percent to 2.0 percent and higher, the source of the double bond must be considered. For example, EPDM polymers prepared using ethylidene norbornene as the termonomer vulcanize more readily than an EPDM polymer prepared using dicyclopentadiene as the termonomer.

While certain representative embodiments and details have been shown for the purpose of illustrating the invention, it will be apparent to those skilled in this art that various changes and modifications may be made therein without departing from the spirit or scope of the invention.

What is claimed is:

1. A sulfur vulcanizable diene rubber containing 0.10 to 3.25 parts of free sulfur per 100 parts by weight of rubber and 0.10 to 3.25 parts by weight per 100 parts by weight of rubber of an accelerator system for the sulfur vulcanization of rubber comprising
   A. 2-(morpholinodithio)-benzothiazole, and
   B. at least one amino thiazole monosulfide compound having the following structural formula:

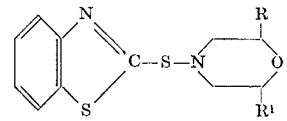

wherein R and R¹ are the same and are selected from the group consisting of hydrogen and alkyl radicals having one to four carbon atoms wherein the weight ratio of (A) to (B) is 1/1 to 7/3 and the combined amount of sulfur plus the accelerator system is from 2.25 to 5.50 parts by weight per 100 parts.

2. A process of preparing a rubbery diene vulcanizate comprising heating the sulfur vulcanizable rubber of claim 1 at a vulcanizing temperature.

3. The sulfur vulcanizable diene rubber according to claim 1 wherein the aminothiazole monosulfide is 2-(morpholinothio)-benzothiazole.

* * * * *